United States Patent [19]

Okochi

[11] Patent Number: 4,677,534
[45] Date of Patent: Jun. 30, 1987

[54] STABILIZING POWER SOURCE APPARATUS
[75] Inventor: Sadao Okochi, Fussa, Japan
[73] Assignee: Kabushiki Kaisha Toshiba, Kawasaki, Japan
[21] Appl. No.: 814,494
[22] Filed: Dec. 30, 1985
[30] Foreign Application Priority Data
Dec. 29, 1984 [JP] Japan .................................. 59-280922
Dec. 28, 1985 [JP] Japan .................................. 59-277717
[51] Int. Cl.$^4$ .......................................... H02M 3/335
[52] U.S. Cl. ........................................ 363/21; 363/26; 363/97; 323/267
[58] Field of Search .................. 363/15, 20, 21, 22, 363/23, 24, 25, 26, 41, 97, 79, 80; 323/247, 249, 267; 307/72, 75

[56] References Cited
U.S. PATENT DOCUMENTS
4,371,918  2/1983  Schierjott ............................. 363/22
4,451,876  5/1984  Ogata .................................. 363/21
4,486,823 12/1984  Palm ................................... 363/21
4,535,399  8/1985  Szepesi ............................. 363/97 X Primary Examiner—Patrick R. Salce
Assistant Examiner—Emanuel T. Voeltz
Attorney, Agent, or Firm—Finnegan, Henderson, Farabow, Garrett & Dunner

[57] ABSTRACT

A stabilizing power source apparatus includes a transformer with one primary and two secondary coils, a switching transistor, first and second differential amplifiers, an oscillator, and a pulse modulator. The oscillator generates a triangular wave of variable frequency. The modulator changes the pulse width and frequency of its output in accordance with a shift of a crossing point between the leading ramp of the triangular wave and the signal from the first differential amplifier. The pulse drives the switching transistor, so that the duty factor of the transistor stabilizes a DC output voltage and a switching frequency thereof stabilizes an AC output voltage. Another stabilizing power source apparatus includes a saturable reactor for stabilizing the DC output voltage and a resonance type inverter to generate a sinusoidal wave voltage.

15 Claims, 5 Drawing Figures

STABILIZING POWER SOURCE APPARATUS

The present application claims priority of Japanese patent application Ser. No. 59-277717 and 59-280922 filed respectively Dec. 28, 1984 and Dec. 29, 1985.

BACKGROUND OF THE INVENTION

The present invention relates to a multiple output type stabilizing power source apparatus for generating stabilized AC and DC voltages.

A typical conventional multiple output type stabilizing power source apparatus as shown in FIG. 5 supplies a stabilized DC voltage to a DC load such as electronic equipment and a stabilized AC voltage to an AC load such as a fluorescent lamp.

Referring to FIG. 5, the stabilizing power source apparatus has inverters at the primary and secondary winding sides. A reference symbol $V_0$ denotes a DC voltage; $Q_1$, a switching transistor; and $T_1$, an inverter transformer. The inverter transformer $T_1$ has a primary winding $N_P$ and a secondary winding $N_S$ Reference symbols $D_1$ and $D_2$ denote rectifying diodes, respectively; $L_1$, a choke coil; and $C_1$, a smoothing capacitor.

A reference symbol $A_1$ denotes a differential amplifier for comparing a reference voltage $V_R$ with a DC output $V_1$ from the secondary winding $N_S$ and generating a signal corresponding to the difference. A reference symbol OSC denotes an oscillator for generating a triangular wave signal; and PWM, a pulse width modulator for converting the triangular wave from the oscillator OSC to pulses of the same frequency as that of the triangular wave and for changing a pulse width of the converted pulses in accordance with a shift of a crossing point between the triangular wave from the oscillator OSC and the signal from the differential amplifier $A_1$. A reference symbol DR denotes a driver for amplifying the pulses from the pulse width modulator PWM and for supplying an amplified signal to the base of the transistor $Q_1$.

A reference symbol INV denotes an inverter for receiving the DC voltage $V_1$ from the secondary winding $N_S$ and for generating an AC voltage upon switching; $T_2$, a voltage transformer for transforming the AC voltage from the inverter INV; $C_F$, a ballasting capacitor; and $R_L$, an AC load for receiving an AC output $V_2$.

It should be noted that a resistor $R_S$ detects a current flowing through the AC load $R_L$, and the inverter INV is switched to keep the current constant in response to the detection signal.

In the conventional stabilizing power source apparatus having the structure described above, a rectangular wave current obtained upon switching of the transistor $Q_1$ is rectified by the diodes $D_1$ and $D_2$ connected to the secondary winding $N_S$. The rectified current is smoothed by the choke coil $L_1$ and the capacitor $C_1$ to provide the DC output $V_1$.

The DC output $V_1$ is supplied to the differential amplifier $A_1$ and is compared with the reference input voltage $V_R$. The differential amplifier $A_1$ provides a signal corresponding to the difference to the pulse width modulator PWM.

In the pulse width modulator PWM, the triangular wave from the oscillator OSC is converted to the pulses of the same frequency as that of the triangular wave. In this case, the pulse width is varied in accordance with the crossing point between the leading ramp of the triangular wave and the output from the differential amplifier $A_1$. The pulse is amplified by the driver DR, and the amplified pulse is supplied to the base of the transistor $Q_1$. The duty factor of the transistor $Q_1$ is thus controlled in response to the output from the differential amplifier $A_1$. Therefore, the DC voltage $V_1$ is kept constant.

On the other hand, the stabilized DC output $V_1$ is supplied to the inverter INV and is converted to the AC voltage upon its switching. The AC voltage is boosted by the transformer $T_2$. The boosted voltage is then applied to the AC load $R_L$ through the capacitor $C_F$. The function of the capacitor is as follows. Then $R_L$ is a discharge lamp, $R_L$ shows a negative resistance characteristic due to an arc in the lamp. To stabilize lamp current, it is generally required that a ballasting impedance is connected in series with the lamp. In this circuit, the capacitor $C_F$ provides the impedance.

When the AC load $R_L$ such as a discharge lamp is driven by the stabilizing power source apparatus described above, an AC voltage which is 3 to 5 times that in normal operation is required to start discharge. Since the capacitor $C_F$ is inserted at the output side of the transformer $T_2$ and the output voltage at the transformer $T_2$ drops to provide the normal operation voltage for the load $R_L$, no voltage drop occurs across the capacitor $C_F$ at the start of discharge when no current flows through the load $R_L$. Thus, a high AC voltage is applied to the load $R_L$.

In the conventional stabilizing power source apparatus, however, since the switching circuits are arranged at the primary and secondary sides of the transformer, the circuit arrangement is complicated.

Furthermore, since the rectangular wave voltage is supplied to the primary winding $N_P$ of the inverter transformer $T_1$, an AC ripple is generated by capacitive couplings between the primary and secondary windings $N_P$ and $N_S$. This ripple has the same phase as that of the normal signal component, so that the ripple is fed back to the primary winding $N_P$ through the ground line at the secondary winding $N_S$. Therefore, common mode noise including a comparatively high frequency component is generated.

In the conventional apparatus of this type, a large line filter must be inserted at the input side to reduce such noise.

SUMMARY OF THE INVENTION

It is an object of the present invention to provide a stabilizing power source apparatus with low-level common mode noise.

It is another object of the present invention to provide a stabilizing power source apparatus which has a simple circuit structure and low manufacturing cost.

According to an aspect of the present invention, there is provided a stabilizing power source apparatus having a primary coil for receiving a DC voltage, a secondary coil magnetically coupled to the primary coil, and a switching element connected in series with the primary coil, the switching element being operated to turn on/off a current flowing through the primary coil so as to obtain a desired voltage output at the secondary coil, wherein the secondary coil is constituted by a first secondary coil and a second secondary coil, and the switching element is provided with a control input terminal for controlling switching thereof, and the apparatus comprises:

a rectifying/smoothing circuit, connected to the first secondary coil, for generating a DC voltage;

a first differential amplifier for comparing a first reference voltage with the DC voltage from the the rectifying/smoothing circuit, and for generating a difference signal representing a difference between the DC voltage and the first reference voltage;

a second differential amplifier for comparing a second reference voltage with an AC voltage from the the second secondary coil, and for generating a difference signal representing a difference between the second reference voltage and the AC voltage;

a pulse modulator for changing pulse width and frequency of a pulse in accordance with output signals from the first and second differential amplifiers; and a driver for amplifying the pulse and supplying an amplified signal to the control input terminal of the switching element, thereby controlling switching of the switching element.

According to another aspect of the present invention, there is provided a stabilizing power source apparatus having a first primary coil for receiving a DC voltage, a secondary coil magnetically coupled to the first primary coil, and a first switching element connected in series with the first primary coil, the first switching element being operated to turn on/off a current flowing through the first primary coil so as to obtain a desired voltage output at the secondary coil, wherein the first switching element has a control input terminal for controlling switching thereof, the secondary coil has at least first and second secondary coils, and the apparatus comprises:

a drive coil magnetically coupled to the first primary coil and connected to the control input terminal of the first switching element;

a differential amplifier for comparing a reference voltage with a DC voltage from the first secondary coil and generating a difference signal representing a difference between the DC voltage and the reference voltage;

an ON time interval control circuit, connected to the first secondary coil, for controlling an ON time interval of the first secondary coil in response to an output signal from the differential amplifier;

a rectifying/smoothing circuit for rectifying and smoothing an output from the ON time interval control circuit and generating the DC voltage; and a ballasting element, connected in series with the second secondary coil, for generating an AC voltage.

DETAILED DESCRIPTION OF THE PREFERRED EMBODIMENTS

Preferred embodiments of the present invention will be described in detail with reference to the accompanying drawings.

Figure 1:
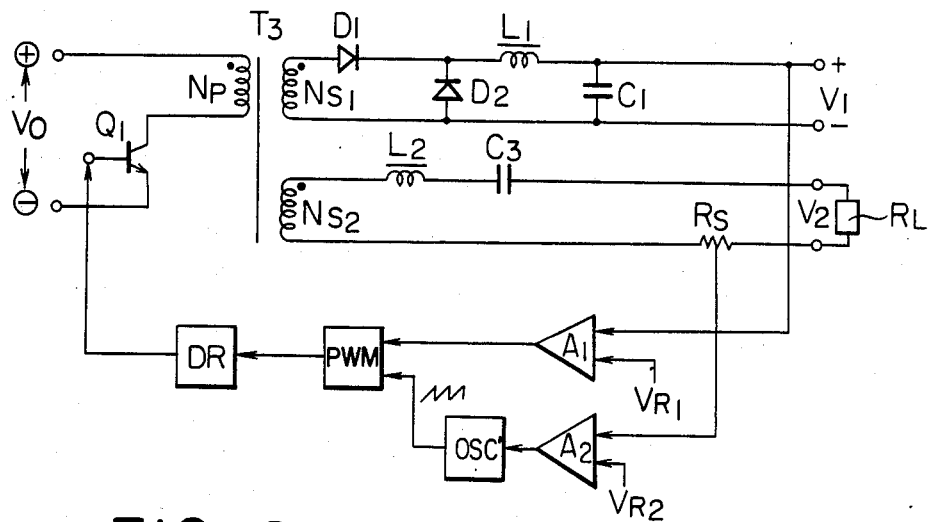
FIG. 1 is a circuit diagram of a stabilizing power source apparatus according to an embodiment of the present invention.
Figure 5:
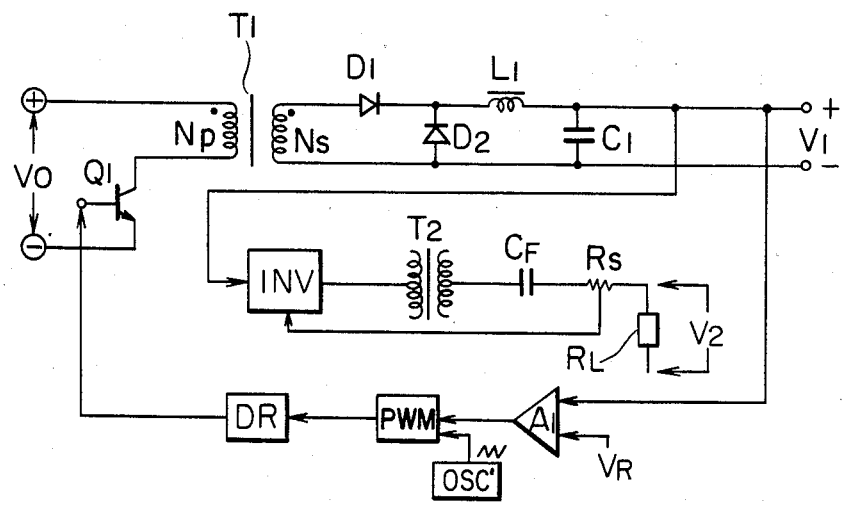
FIG. 5 is a circuit diagram of a conventional stabilizing power source apparatus.

FIG. 1 is a circuit diagram of a stabilizing power source apparatus according to an embodiment of the present invention. The same reference numerals as in FIG. 5 denote the same parts in FIG. 1.

Referring to FIG. 1, a reference symbol $V_0$ denotes an input DC voltage; $Q_1$, a switching element; and $T_3$, an inverter transformer. The inverter transformer $T_3$ has a primary winding $N_P$, a DC voltage output secondary winding $N_{S1}$ magnetically coupled to the primary winding $N_P$, and an AC output secondary winding $N_{S2}$ magnetically coupled to the primary winding $N_P$. In the above arrangement, the switching element $Q_1$ comprises a bipolar transistor but can be replaced with a GTO thyristor, a normal thyristor or the like.

Reference symbols $D_1$ and $D_2$ denote rectifying diodes for the secondary winding $N_{S1}$; $L_1$, a choke coil; $C_1$, a smoothing capacitor; $L_2$, a choke coil for the secondary winding $N_{S2}$; $C_3$, a filter capacitor; $R_S$, a resistor for detecting a load current; and $R_L$, an AC load.

A reference symbol $A_1$ denotes a differential amplifier for comparing a reference input voltage $V_{R1}$ with the DC voltage from the secondary winding $N_{S1}$ and generating a signal representing the difference therebetween. A reference symbol $A_2$ denotes a differential amplifier for receiving the AC voltage from the load current detecting resistor $R_S$ inserted between the secondary winding $N_{S2}$ and the load $R_L$, comparing the AC voltage with a reference input voltage $V_{R2}$ and generating a signal representing the difference therebetween. A reference symbol OSC' denotes an oscillator for generating a triangular wave, the leading or trailing ramp of which is changed in response to the signal from the differential amplifier $A_2$. A reference symbol PM denotes a pulse modulator for comparing the output signal from the differential amplifier $A_1$ with the triangular wave from the oscillator OSC' and generating a pulse, the width and frequency of which are changed in accordance with the shift of the crossing point between these input signals. A reference symbol DR denotes a driver for amplifying the pulse and supplying an amplified signal to the base of the transistor $Q_1$.

In the stabilizing power source apparatus having the arrangement described above, the duty factor of the transistor $Q_1$ is controlled to keep the DC output voltage $V_1$ constant. At the same time, the switching frequency of the transistor $Q_1$ is controlled to keep the AC load current constant.

The operation of the stabilizing power source apparatus will be described in detail hereinafter.

Figure 2:
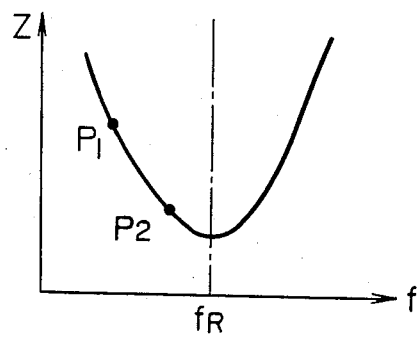
FIG. 2 is a graph showing the relationship between the switching frequency and the input impedance.

FIG. 2 is a graph showing the relationship between input impedance Z and frequency f when the AC load $R_L$ is viewed from the secondary winding $N_{S2}$.

When the AC load $R_L$ comprises a light load, the switching frequency f of the transistor $Q_1$ is decreased. Accordingly, the input impedance Z is increased and the load current is decreased ($P_1$ in FIG. 2).

However, when the AC load $R_L$ comprises a heavy load, the switching frequency f of the transistor $Q_1$ is increased. Accordingly, the input impedance Z is increased, and the load current is also increased ($P_2$ in FIG. 2).

The input impedance Z is given by:

$$Z = j\omega L_2 + 1/(j\omega C_3) + R_L$$

The resonant frequency $f_R$ is given by:

$$f_R = \tfrac{1}{2}\pi \cdot 1/\sqrt{L_2 C_3}$$

When the load current is increased in the apparatus in FIG. 1, the voltage input to the differential amplifier $A_2$ is increased, and hence the voltage output from the differential amplifier $A_2$ is increased. In response to an increase in output voltage, the oscillation frequency of the oscillator OSC' is decreased, but the input impedance Z is increased. As a result, the load current is decreased. Therefore, the current flowing through the load current is always kept constant.

Figure 3:
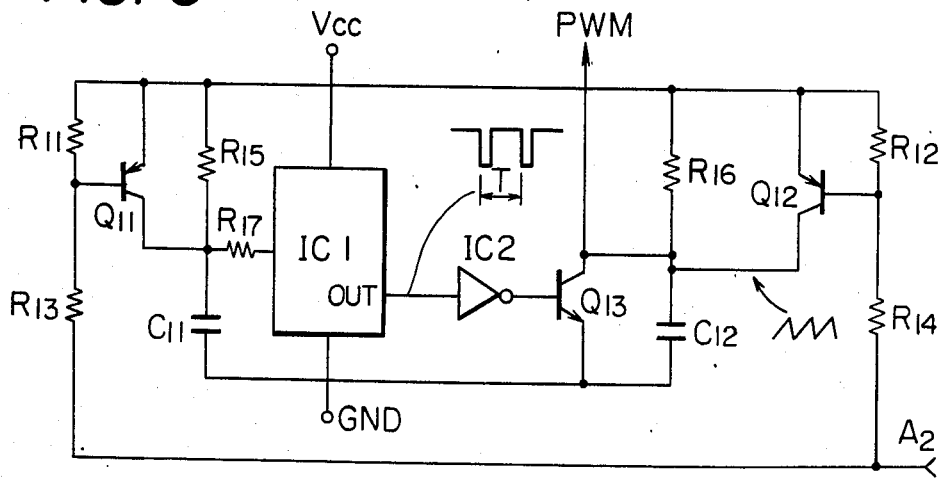
FIG. 3 is a circuit diagram of an oscillator OSC' in the apparatus in FIG. 1.

FIG. 3 is a circuit diagram of the oscillator OSC' in the apparatus in FIG. 1.

Referring to FIG. 3, reference symbols $R_{11}$ to $R_{17}$ denote resistors; $C_{11}$ and $C_{12}$, capacitors; $Q_{11}$ to $Q_{13}$, transistors; $IC_1$, an integrated circuit element as a timer circuit; and $IC_2$, an integrated circuit element as a NAND gate.

In the oscillator OSC' described above, the timer circuit $IC_1$ generates a clock signal with a period T at an output terminal OUT thereof so as to charge the capacitor $C_{11}$ in accordance with a time constant determined by the resistance of the resistor $R_{15}$ and the capacitance of the capacitor $C_{11}$, and at the same time, discharge the capacitor $C_{11}$ in accordance with a time constant determined by the resistance of the resistor $R_{17}$ and the capacitance of the capacitor $C_{11}$.

The clock signal is supplied to the base of the transistor $Q_{13}$ through the NAND gate $IC_2$, so that the triangular wave voltage appears across the capacitor $C_{12}$ upon ON/OFF operation of the transistor $Q_{13}$.

The triangular wave voltage signal is supplied from the collector of the transistor $Q_{13}$ to the pulse modulator PM.

When the AC voltage $V_2$ is constant and the signal from the differential amplifier $A_2$ is the reference voltage value, the transistor $Q_{11}$ is turned off. The timer circuit $IC_1$ generates the clock signal of a predetermined frequency. However, when the AC output $V_2$ is decreased and then the signal voltage from the differential amplifier $A_2$ is decreased, the internal resistance of the transistor $Q_{11}$ is decreased and the charge rate of the capacitor $C_{11}$ is increased. As a result, the period T of the clock signal is shortened.

Upon shortening of the period T, the internal resistance of the transistor $Q_{12}$ is decreased to increase the charge rate of the capacitor $C_{12}$. The leading ramp of the triangular wave becomes steep. However, when the AC output $V_2$ is increased, the leading ramp of the triangular wave becomes moderate in the reverse process.

The frequency of the oscillator OSC' varies in accordance with variations in the output signal from the differential amplifier $A_2$ which, in turn, varies in accordance with variations in the AC output $V_2$.

In the pulse modulator PM, the width and frequency of the pulse supplied to the base of the switching transistor $Q_1$ vary in accordance with the variations in the voltage from the differential amplifier $A_1$ and the frequency of the triangular wave from the oscillator OSC'. The duty factor and the switching frequency of the transistor $Q_1$ are controlled to keep the DC voltage $V_1$ and the AC voltage $V_2$ constant.

In the above embodiment, the inverter at the primary winding comprises a forward type inverter. However, the present invention is not limited to this arrangement.

A half-bridge type inverter or a full-bridge type inverter can be used in place of the forward type inverter.

The pulse width and frequency control circuit is exemplified by a PWM consisting of a variable frequency triangular wave oscillator and a comparator in the above description. Alternatively, the output signals from the two amplifiers can be supplied to an astable multivibrator to control the ON time intervals of transistors constituting the astable multivibrator. Therefore, the switching frequency and the ON time intervals can be simultaneously controlled.

Figure 4:
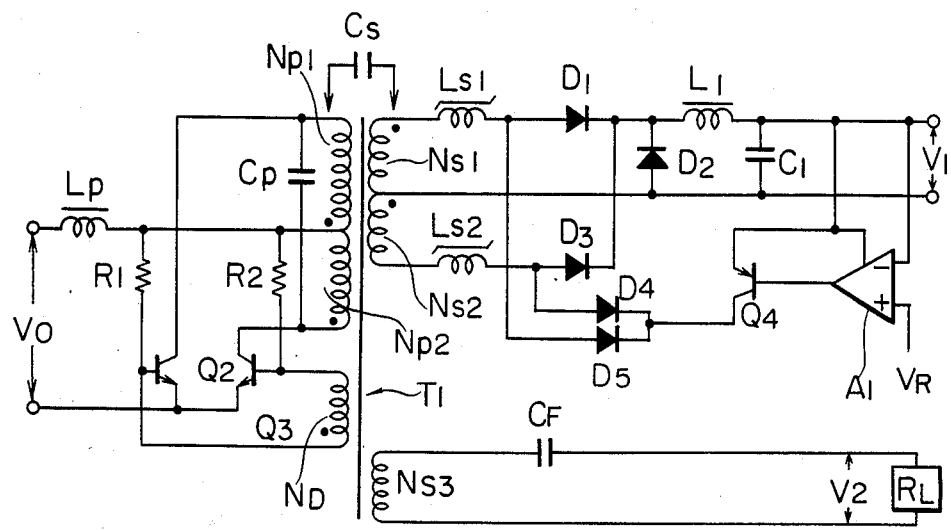
FIG. 4 is a circuit diagram of a stabilizing power source apparatus according to another embodiment of the present invention.

FIG. 4 is a circuit diagram of a stabilizing power source apparatus according to another embodiment of the present invention. The same reference numerals as in FIG. 1 denote the same parts in FIG. 4.

Referring to FIG. 4, a reference numeral $V_0$ denotes an input DC voltage; $L_p$, a choke coil; $Q_2$ and $Q_3$, switching transistors which are alternately turned on/off; and $T_1$, an inverter transformer. The inverter transformer $T_1$ has primary windings $N_{P1}$ and $N_{P2}$. A reference symbol $N_D$ denotes a drive coil connected to the bases of the transistors $Q_2$ and $Q_3$. A reference symbol $C_P$ denotes a resonant capacitor inserted in parallel with the primary windings $N_{P1}$ and $N_{P2}$. The switching transistors $Q_2$ and $Q_3$ comprise bipolar transistors, respectively, in the above arrangement, but can be replaced with other switching elements such as MOSFETs, GTO thyristors, on normal thyristors. When thyristors are used, a waveshaper must be inserted between the coil $N_D$ and the two terminals of the switching element. In the case of thyristors, a commutating circuit must be added to turn off the thyristors.

The above arrangement constitutes a resonant inverter for generating a sinusoidal wave voltage across the primary windings $N_{P1}$ and $N_{P2}$.

The switching operation of the two transistors is called push-pull operation.

Reference symbols $N_{S1}$ and $N_{S2}$ denote secondary windings of the inverter transformer $T_1$; $L_{S1}$ and $L_{S2}$, saturable reactors connected in series with the secondary windings $N_{S1}$ and $N_{S2}$, respectively; $D_1$, $D_2$ and $D_3$, rectifying diodes; $L_1$, a choke coil; and $C_1$, a smoothing capacitor.

A reference symbol $N_{s3}$ denotes an AC output secondary winding; $C_F$, a ballasting capacitor; and $R_L$, an AC load.

A reference symbol $A_1$ denotes a differential amplifier for comparing a reference voltage $V_R$ with the DC voltage $V_1$ and generating a signal representing the difference therebetween. A reference symbol $Q_4$ denotes a transistor, the base of which is connected to the differential amplifier $A_1$ to receive the difference signal as a base current, the collector of which is connected to reactors $L_{S2}$ and $L_{S1}$ respectively through the saturable diodes $D_4$ and $D_5$ and the emitter of which is connected to the DC voltage $V_1$. The transistor $Q_4$ comprises a bipolar transistor, but can be replaced with another output current control element such as a MOSFET.

The operation of the stabilizing power source apparatus having the arrangement described above will be described hereinafter.

When the input DC voltage $V_0$ is supplied to the apparatus, a current flows in the bases of the transistors $Q_2$ and $Q_3$ through the resistors $R_1$ and $R_2$, so that one of the transistors $Q_2$ and $Q_3$ is turned on (it is indefinite which transistor is turned on first).

Assume that the transistor $Q_2$ is turned on first and the voltage $V_0$ is supplied to the primary winding $N_{P1}$ of the inverter transformer $T_1$.

In this case, a voltage obtained by dividing the DC input voltage $V_0$ in accordance with the number of turns is induced at the drive coil $N_D$ magnetically coupled to the primary winding $N_{P1}$. The base-emitter path of the transistor $Q_3$ is reverse-biased, and the transistor $Q_3$ is kept off. In this case, the voltage generated at the primary winding $N_{P1}$ is a sinusoidal wave.

A self-excited angular frequency $\omega$ is given as:

$$\omega = 1/\sqrt{L_H(C_P' + C_F')}$$

where $L_H$ is the inductance of the primary winding $N_{P1}$ of the inverter transformer $T_1$, $C_P'$ is the capacitance for the primary winding $N_{P1}$ based on the resonant capacitor $C_P$, and $C_F'$ is the capacitance for the primary winding $N_{P1}$ based on the ballasting capacitor $C_F$.

When the sinusoidal wave voltage at the primary winding $N_{P1}$ changes to the negative polarity through a zero-crossing point, the induction voltage at the drive coil $N_D$ changes likewise.

The induction voltage at the drive coil $N_D$ which has been supplied as the reverse-bias voltage to the base of the transistor $Q_3$ is then forward-biased. The transistor $Q_2$ is now reverse-biased to turn on the transistor $Q_3$ and turn off the transistor $Q_2$. As a result, the self-excited resonance is set in the negative half cycle.

The transistors $Q_2$ and $Q_3$ are alternately turned on/off to generate the sinusoidal wave current at the primary windings $N_{P1}$ and $N_{P2}$. The current is then extracted at the secondary windings $N_{S1}$ and $N_{S2}$.

If the saturable reactors $L_{S1}$ and $L_{S2}$ were not present the sinusoidal wave current would be full-wave rectified by the diodes $D_1$ and $D_3$. The rectified current is smoothed by the choke coil $L_1$ and the capacitor $C_1$ to provide the DC voltage $V_1$. In this case, the DC voltage $V_1$ still varies in accordance with variations in the input DC voltage $V_0$.

In order to stabilize the output voltage $V_1$, the saturable reactors $L_{S1}$ and $L_{S2}$ are connected in series with the secondary windings $N_{S1}$ and $N_{S2}$, respectively, thereby performing phase control.

In this embodiment, the saturable reactors are used to reduce noise at the secondary windings of the transformer. The saturable reactors serve as elements for controlling ON time of currents flowing through the coils and may be replaced with switching elements such as transistors.

The saturable reactors $L_{S1}$ and $L_{S2}$ are arranged such that the phase control angles representing the present saturation timings are determined by the reset values of the magnetic flux. When the reset values are increased, the phase control angles are increased, and thus the output voltages are decreased.

The DC voltage $V_1$ is compared by the differential amplifier $A_1$ with the reference input voltage $V_R$, and the difference signal from the differential amplifier $A_1$ is supplied to the base of the transistor $Q_4$. In this case, since the collector of the transistor $Q_4$ is connected to the saturable reactors $L_{S1}$ and $L_{S2}$, the reset values of the saturable reactors $L_{S1}$ and $L_{S2}$ are controlled to cancel the variations in the DC voltage $V_1$.

The DC voltage $V_1$ is kept constant.

The AC voltage from the secondary windings $N_{S3}$ is supplied to the AC load $R_L$ through the ballasting capacitor $C_F$.

The transistors $Q_2$ and $Q_3$ have conduction times. The transistors $Q_2$ and $Q_3$ are simultaneously turned on when the sinusoidal wave voltages at the primary windings $N_{P1}$ and $N_{P2}$ are set to 0. In this case, the choke coil $L_P$ is arranged at the DC input side to limit the short-circuiting current.

In the above embodiment, the capacitor $C_F$ is used as the ballasting element of the AC output secondary winding $N_{S3}$. However, a choke coil may be inserted in place of the capacitor $C_F$.

In this case, the self-excited angular frequency $\omega'$ is given as:

$$\omega' = 1/\sqrt{(L_P//L_F')C_P'}$$

where $L_F'$ is the inductance of the choke coil $L_F$ which is figured out on the basis of the primary winding $N_{P1}$, and $L_P//L_F'$ is the total inductance of the inductance of the choke coil $L_P$ and the inductance $L_F'$.

In the stabilizing power source apparatus described above, the sinusoidal wave voltage is applied in the collector-emitter paths of the transistors $Q_2$ and $Q_3$, and the voltages at the transistors $Q_2$ and $Q_3$ are substantially zero at the turn on/off timing, thereby decreasing the switching loss.

Since the sinusoidal wave signal is supplied to the primary winding of the inverter transformer $T_1$, only low-level harmonic waves are generated as compared with the case wherein a rectangular wave voltage is supplied to the primary winding of the inverter transformer $T_1$.

Since the common mode AC current flowing in the secondary windings through the coupling capacitance $C_S$ between the primary and secondary windings is decreased, the line filter at the input side need not be large in size.

Since the switching loss is decreased as described above, the switching frequency can be increased, and the inverter transformer $T_1$ can be made compact.

According to the present invention, the stabilizing power source apparatus has a single switching circuit, so that the number of components is decreased and the manufacturing cost is decreased. In addition, the apparatus is made small as a whole, and its reliability is improved.

According to the present invention, the sinusoidal wave is supplied to the primary windings, so that the conduction noise is decreased, and the circuit arrangement can be simplified.

Furthermore, since the switching frequency can be increased, the transformer can be made compact and the apparatus as a whole can be made compact.

The number of transformers can be decreased, and the insulated portion between the primary and secondary windings is decreased, thereby simplifying insulation design.

What is claimed is:

1. A power source apparatus for generating both a stabilized DC power output voltage and a stabilized AC power load current comprising:
    transformer means including a primary coil, a first secondary coil and a second secondary coil, wherein the first and second secondary coil are magnetically coupled to said primary coil, and the primary coil receives a DC input voltage;

switching means connected to the primary coil of the transformer means for switching the DC input voltage supplied to the primary coil;

means connected between the first secondary coil and a DC load for converting an output voltage of the first secondary coil into a DC output voltage;

DC output detecting means responsive to the converting means for generating a first control signal in response to the DC output voltage;

AC output detecting means coupled to the second secondary coil to which an AC load is coupled, for detecting the AC load current flowing to the AC load and for generating a second control signal in response to the AC voltage;

DC output voltage stabilizing means connected to the DC output detecting means for stabilizing the DC output voltage in response to the first control signal;

AC load current stabilizing means connected to the AC output detecting means for stabilizing the AC load current regardless of the AC load; and wherein said AC load current stabilizing means includes switching frequency control means connected to the AC output detecting means for controlling the frequency of switching of the switching means in response to the second control signal to stabilize the AC load current and impedance means connected between the second secondary coil and the AC load for controlling the AC load current by varying the impedance according to the frequency of the signal generated on the second secondary coil.

2. The power source apparatus according to claim 1, wherein said DC output voltage stabilizing means includes switching duty control means connected to the switching means for controlling duty of switching of the switching means in response to the first control signal.

3. The power source apparatus according to claim 1, wherein said DC output voltage stabilizing means includes an ON time interval control circuit connected to said first secondary coil for controlling an ON time interval of said first secondary coil in response to the first control signal.

4. The power source apparatus according to claim 3, wherein said ON time interval control circuit includes a control element for receiving the first control signal and generating a control current in response to the output signal, and a second switching element, connected in series with said first secondary coil, for swtiching said first secondary coil in accordance with the control current.

5. The power source apparatus according to claim 4, wherein said second switching element comprises a saturable reactor.

6. The power source apparatus according to claim 1, wherein said DC output detecting means includes means for generating the first control signal in response to a difference between the DC output voltage and a first reference voltage.

7. The power source apparatus according to claim 6, wherein said first control signal generating means includes a first differential amplifier for comparing the first reference voltage with the DC output voltage and generating the first control signal representing a difference therebetween.

8. The power source apparatus according to claim 1, wherein the AC output detecting means includes resistor means coupled serially to the second secondary coil and the AC load for converting the AC load current into an AC voltage, and means for generating the second control signal in response to the AC voltage and a second reference signal.

9. The power source apparatus according to claim 8, wherein the second control signal generating means includes a second differential amplifier for comparing the AC voltage and the second reference voltage and generating the second control signal in response to a difference therebetween.

10. The power source apparatus according to claim 1, wherein said DC voltage stabilizing means and the switching frequency controlling means include the same pulse signal generating means for generating a pulse signal having a width determined by the first control signal and a frequency determined by said second control signal means and supplying the pulse signal to the switching means.

11. The power source apparatus according to claim 1, wherein said switching frequency control means includes means for generating a sinusoidal signal of variable frequency, said frequency dependent on the second control signal, and said DC voltage stabilizing means includes a pulse signal generating means for generating a pulse signal having a width determined by the first control signal, the pulse signal generating means matching the frequency of the pulse signal with that of the signal from the sinusoidal signal generating means.

12. The power source apparatus according to claim 11, wherein said sinusoidal signal generating means comprises an oscillator for generating a triangular wave, the frequency of which is changed in response to the second control signal, and said pulse signal generating means comprises a pulse modulator for generating the pulse signal in accordance with a shift of a crossing point between a leading ramp of the triangular wave and the first control signal.

13. The power source apparatus according to claim 11, wherein said DC output voltage stabilizing means further includes a driver means connected between the switching means and the pulse signal generating means for amplifying the pulse signal and supplying an amplified pulse signal to the switching means.

14. The power source apparatus according to claim 1, wherein said AC load current control means includes a resonant circuit and the switching frequency of the switching means is lower than the resonant frequency of said AC load current controlling means.

15. The power source apparatus according to claim 14, wherein the resonant circuit includes an inductor and a capacitor both connected in series with the second secondary coil, and the resonant frequency is determined by the inductance of the inductor and the capacitance of the capacitor.

* * * * *